United States Patent Office 3,702,856
Patented Nov. 14, 1972

3,702,856
PREPARATION OF ALKYL HALIDES, CARBOXYLATES AND ALCOHOLS
Donald M. Fenton, Anaheim, Calif., assignor to Union Oil Company of California, Los Angeles, Calif.
No Drawing. Filed Nov. 19, 1969, Ser. No. 878,231
Int. Cl. C07c 17/08; C11c 3/00
U.S. Cl. 260—410.9 R
16 Claims

ABSTRACT OF THE DISCLOSURE

Alkyl halides, carboxylates and/or alcohols are prepared by contacting ethylene or propylene and a hydrohalic acid, carboxylic acid and/or water with a reaction medium comprising a Group VIII noble metal at a temperature of 100°–400° C. A typical process comprising contacting ethylene with an acidic aqueous medium to produce secondary butyl alcohol.

DESCRIPTION OF THE INVENTION

The invention relates to the preparation of halo, carboxylate and alcohol derivatives of butane and hexane. More particularly, the invention relates to the preparation of these derivatives from ethylene and propylene.

It is known in the art that halo, carboxylate or alcohol derivatives of lower alkanes may be formed by reacting an olefin with a hydrohalic acid, carboxylic acid or water. The prior art processes, however, necessitate the use of an olefin having the same number of carbons as the alkane derivative, e.g., reacting butene with hydrochloric acid to produce secondary butyl chloride. Ethylene and propylene are less expensive than butene and hexene and thus the process of the invention represents a substantial economical saving.

The process of the invention involves the dimerization of ethylene and/or propylene and reaction with a hydrohalic acid, carboxylic or water to form the corresponding dimer derivative. The reaction proceeds according to the following equations:

(1) 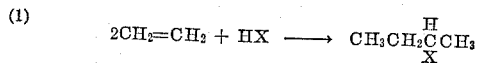

(2) 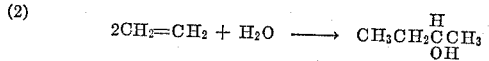

(3) 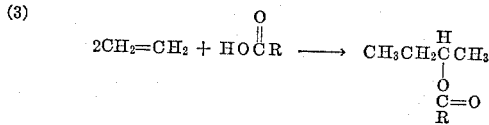

The hydrohalic acid (indicated hereinabove as HX) may be hydrochloric acid, hydrobromic acid, hydroiodic acid or hydrofluoric acid and is preferably hydrochloric or hydrobromic acid. The acid is generally provided in aqueous media in concentrations of 10–90 weight percent, preferably 30–70 percent acid.

The carboxylic acid reacted to form the butyl or hexyl carboxylate has 2 to about 18 carbons, preferably 2 to 12 carbons and has the general formula:

RCOOH wherein R is alkyl, or monocyclic cycloalkyl, cycloalkylalkyl, aryl, aralkyl or alkaryl, preferably alkyl.

Examples of suitable carboxylic acids include acetic acid, propionic acid, butyric acid, valeric acid, octanoic acid, decanoic acid, lauric acid, palmatic acid, stearic acid, benzoic acid, cyclohexanacetic acid, cyclopentanetridecanoic acid, 4-phenyloctanoic acid, 3-cyclopentyl-4-tolylheptanoi acid, etc. Examples of the preferred fatty acids are acetic acid, propionic acid, butyric acid, valeric acid, hexanoic acid, heptanoic acid, lauric acid, etc.

The reaction is conducted in the presence of a Group VIII noble metal, e.g., ruthenium, rhodium, palladium, osmium, iridium, or platinum. The preferred metals are rhodium, palladium, iridium, or platinum, most preferably rhodium and palladium. A catalytic quantity of the metal is added (e.g., 0.001–10 weight percent, perferably 0.002–5 weight percent of the reaction medium) and the metal may be added as a soluble salt (halide, nitrate, sulfate, $C_1$–$C_{12}$ carboxylate, etc.), carbonyl, hydride, or as a chelate.

Examples of suitable sources of the noble metals are iridium carbonyl chloride, iridium carbonyl, iridium tetrabromide, iridium tribromide, iridium trifluoride, iridium trichloride, osmium trichloride, chloroosmic acid, palladium hydride, palladous chloride, palladous cyanide, palladous iodide, osmium isopropionate, iridium valerate, palladium acetate, palladous nitrate, platinic acid, platinous iodide, sodium hexachloroplatinate, potassium trichloro (ethylene) platinate(II), chloropentaamminorhodium (II) chloride, rhodium dicarbonyl chloride dimer, rhodium nitrate, rhodium trichloride, rhodium carbonyl hydride, ruthenium, trichloride, tetraamminoruthheniumhydroxychloro chloride; etc. Generally the halide salt and particularly the chloride salt are preferred sources of the Group VII noble metal (e.g., palladium chloride, rhodium chloride, etc.).

The reaction is performed under liquid phase conditions and can be conducted in the presence of a suitable liquid which, preferably, is a solvent for the reactants and catalyst and is inert thereto. Suitable liquids include hydrocarbons, ketones, esters, and ethers, which are exemplified by hexane, heptane, octane, benzene, toluene, cyclohexane, cyclodecane, methyl, ethyl, ketone, diethyl ketone, ethyl N-butyl ketone, cyclohexanone, butyl ether, methyl tolyl ether, di-iso-amyl ether, methyl acetate, ethyl acetate, etc. In the case wherein the reactant is a hydrohalic acid and/or water, the reaction medium may be aqueous. When a carboxylic acid is a reactant, the reaction solvent may be an excess amount of the carboxylic acid.

The reaction may be preformed at moderate temperatures such as 50°–400° C., preferably 100°–300° C., and at moderate pressures such as 1–200 atmospheres, preferably 5 to 30 atmospheres and sufficient to maintain liquid phase conditions. The desired pressure may be maintained by adding an inert gas, e.g., nitrogen to the reaction mixture. In most instances, the pressure of the reactant ethylene or propylene is sufficient to maintain the aforementioned pressures.

The reaction can be performed batchwise or in a continuous fashion. When operating batchwise, the catalyst, reaction medium, reactant acid and/or water can be introduced into the reaction zone to form a liquid phase therein and the reaction zone can be pressured with ethylene or propylene, the latter being added as a liquid under liquefying pressure, and heated to the desired reaction temperature. When desired, to moderate the reaction, an inert gas can also be added, particularly with ethylene. When performing the reaction in a continuous fashion the liquid components can be charged to the reaction zone to form a liquid phase therein and ethylene or propylene and the appropriate acid or water reactant continuously introduced into the reaction zone to contact the reaction medium containing the catalyst. Both ethylene and propylene can be introduced into the reaction zone as described above, and in such instances a pentyl derivative, in addition to the butyl and hexyl derivatives, is formed.

The liquid product can be recovered from the reaction zone by withdrawing a stream of the liquid reaction medium contained therein and the desired product(s) recovered therefrom by conventional separation processing such as distillation.

The process is preferably conducted in the presence of a strong inorganic acid. In reaction (1) given hereinabove wherein hydrohalic acid is a reactant, addition of acid is, of course, not required. In regard to the processes shown in reactions (2) and (3), any of the aforementioned hydrohalic acids are suitable sources of a strong acid as well as nitric acid, sulfuric acid, phosphoric acid, etc. A minor amount of the acid is added, e.g., 0.1–20 weight percent, preferably 0.1–5 weight percent of the reaction medium and the acid may be added in an aqueous medium at a concentration of 20–90 weight percent, preferably 50–80 percent of the acid. The added hydrohalic acid, if utilized, will react with the ethylene or propylene to form the corresponding halo derivative which, when formation of a carboxylate or alcohol is desired, is essentially a by-product of the process. In instances where the halo by-product is not desirable, it may be recycled to the reaction medium to discourage further formation of the by-products. In instances where a halo by-product is not desired, it is preferable that the added acid be nitric acid, sulfuric acid, or phosphoric acid which does not readily react with olefins.

EXAMPLE 1

The following example illustrates the invention and the results actually obtained:

To a tantalum-lined steel bomb were added 20 milliliters concentrated hydrochloric acid, 75 milliliters acetic acid, 20 milliliters water and 0.3 gram rhodium trichloride. The bomb was pressured with ethylene to about 55 atmospheres. The bomb contents were heated to and maintained at 125° C. for 3 hours and then at 175° C. for another 3 hours. The final pressure was observed to be about 10 atmospheres, indicating the consumption of ethylene. The liquid contents were removed and analyzed to find 23 grams of secondary butyl chloride, 23 grams of secondary butyl acetate, and 4 grams secondary butyl alcohol.

EXAMPLE 2

The following examples illustrate other modes of practice presently contemplated.

To an autoclave are added 500 milliliters of a 50 percent solution of hydrobromic acid and 10 grams palladium chloride. The autoclave is pressured with ethylene to 50 atmospheres and heated to and maintained at 300° C. for 4 hours. The liquid contents are removed and secondary butyl bromide is separated therefrom.

To an autoclave are added 400 milliliters of a 30 weight percent aqueous solution of nitric acid and 20 grams of iridium chloride. The autoclave is pressured with 20 atmospheres of ethylene and heated to and maintained at 200° C. for 3 hours. The liquid contents are removed and secondary butyl alcohol is recovered therefrom.

To an autoclave are added 300 milliliters of propylene, 400 milliliters of a 80 percent solution of hydrochloric acid and 10 grams iridium chloride. The autoclave is heated to and maintained at 200° C. for 10 hours. The liquid contents are removed and hexyl chloride is recovered by distillation.

To an autoclave are added 400 milliliters water, 10 grams of 90 percent nitric acid, and 10 grams of rhodium nitrate. The autoclave may be pressured with ethylene to 40 atmospheres and heated to and maintained at 250° C. for 4 hours. The liquid contents are removed and secondary butyl alcohol is recovered therefrom.

To an autoclave are added 200 milliliters propionic acid and 10 grams rhodium chloride. The autoclave is pressured with ethylene to 30 atmospheres and heated to and maintained at 200° C. for 6 hours. The liquid contents are removed and secondary butyl propionate is recovered therefrom.

To an autoclave are added 300 milliliters of propylene, 500 milliliters of decanoic acid and 10 grams iridium acetate. The autoclave is heated to and maintained at 200° C. for 4 hours. The liquid contents are removed and secondary hexyl decanoate is removed by distillation.

To an autoclave are added 200 milliliters of benzoic acid, 50 milliliters of a 50 percent solution of hydrochloric acid, and 10 grams rhodium chloride. The autoclave is pressured with ethylene to 50 atmospheres and heated to and maintained at 200° C. for 2 hours. The liquid contents are removed and a mixture of secondary butyl chloride and secondary butyl benzoate is recovered. The secondary butyl chloride is recycled to the autoclave for use in a subsequent reaction.

The foregoing examples are given solely to illustrate the invention and the invention shall not be limited thereby.

I claim:

1. A process for production of alkyl halides, alkyl carboxylates or alcohols containing from 4 to 6 carbons in the alkyl portion comprising contacting an olefin selected from ethylene, propylene or mixtures thereof with a liquid reaction medium comprising a hydrohalic acid selected from the group consisting of hydrochloric, hydrobromic, hydroiodic, and hydrofluoric acids or mixtures thereof; a $C_2$–$C_{18}$ carboxylic acid, water or mixtures thereof and from 0.001 to 10 weight percent of a Group VIII noble metal at a temperature of 50°–400° C. and a pressure sufficient to maintain liquid phase reaction conditions to dimerize said olefin and react the dimerized olefin with said reaction medium.

2. The method of claim 1 wherein a Group VIII noble metal is rhodium, palladium, iridium, or platinum.

3. The process of claim 1 wherein said hydrohalic acid is hydrochloric and hydrobromic acid.

4. The method of claim 1 wherein the reaction medium comprises water to produce an alcohol.

5. The method of claim 1 wherein the reaction medium comprises a fatty acid to produce a fatty acid carboxylate.

6. The method of claim 1 wherein ethylene is contacted with the medium.

7. The method of claim 6 wherein said hydrohalic acid is hydrochloric or hydrobromic, wherein said carboxylic acid is a fatty carboxylic acid having 2 to 12 carbons and wherein said Group VIII noble metal is rhodium or palladium.

8. The method of claim 6 wherein said Group VIII noble metal is rhodium which is added to the reaction medium as rhodium trichloride.

9. The method of claim 1 wherein said reaction medium comprises an aqueous hydrohalic acid containing from 0.1 to 20 weight percent of said hydrohalic acid.

10. The method of claim 9 wherein the concentration of said hydrohalic acid is from 0.1 to 5 weight percent.

11. The method of claim 1 wherein said reaction medium comprises a mixture of hydrobromic or hydrochloric acid, a $C_2$–$C_{12}$ carboxylic acid and water.

12. The method of claim 11 wherein said Group VIII noble metal is rhodium.

13. The method of claim 12 wherein said rhodium is added to the reaction zone as rhodium trichloride.

14. The reaction of claim 13 wherein the temperature is maintained from 100 to 300° C.

15. The method of claim 14 wherein said reaction medium comprises an aqueous mixture of acetic and hydrochloric acids.

16. The process defined in claim 1 wherein said liquid reaction medium is water and wherein said reaction medium also contains from 0.1 to 20 weight percent of a strong inorganic acid selected from the class of nitric, sulfuric and phosphoric acid.

References Cited
UNITED STATES PATENTS

| | | | |
|---|---|---|---|
| 3,420,902 | 1/1969 | Olson et al. | 260—653.6 |
| 2,083,693 | 6/1937 | Dreyfus | 260—641 |
| 2,055,269 | 9/1936 | Johannes et al. | 260—641 |
| 2,484,702 | 10/1949 | Trey | 260—641 |
| 1,986,882 | 1/1935 | Dreyfus | 260—641 |
| 2,870,217 | 1/1959 | Toland | 260—641 |
| 3,352,930 | 11/1967 | Mention et al. | 260—641 |
| 2,020,673 | 11/1935 | Dreyfus | 260—497 R |
| 2,093,695 | 9/1937 | Larson | 260—497 R |
| 3,006,970 | 10/1961 | Reuther et al. | 260—641 |
| 2,156,718 | 5/1939 | Bent et al. | 260—641 |
| 2,797,247 | 6/1957 | Keith | 260—641 |
| 1,977,633 | 10/1934 | Horsley | 260—641 |
| 2,891,999 | 6/1959 | Langner | 260—641 |

LORRAINE A. WEINBERGER, Primary Examiner

R. S. WEISSBERG, Assistant Examiner

U.S. Cl. X.R.

260—468 R, 476 R, 497 A, 641, 653.6, 663